(12) United States Patent
Stahlmann et al.

(10) Patent No.: US 7,902,838 B2
(45) Date of Patent: Mar. 8, 2011

(54) SENSOR DEVICE FOR DETERMINING A FLUID PROPERTY

(75) Inventors: Daniel Stahlmann, Williamsburg, VA (US); Isabelle McKenzie, Poquoson, VA (US); Ray Wildeson, Yorktown, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 0 days.

(21) Appl. No.: 10/991,245

(22) Filed: Nov. 17, 2004

(65) Prior Publication Data

US 2006/0103393 A1    May 18, 2006

(51) Int. Cl.
  *G01R 27/26*    (2006.01)
(52) U.S. Cl. .......................... 324/658; 324/453
(58) Field of Classification Search .................. 324/658, 324/453
  See application file for complete search history.

(56) References Cited

U.S. PATENT DOCUMENTS

| | | | |
|---|---|---|---|
| 3,819,402 A | 6/1974 | Thrower, Jr. | |
| 4,426,616 A | 1/1984 | Maier | |
| 4,428,026 A | 1/1984 | Maltby et al. | |
| 4,555,661 A | 11/1985 | Benson et al. | |
| 4,915,084 A | 4/1990 | Gonze | |
| 4,924,702 A | 5/1990 | Park | |
| 4,945,863 A | 8/1990 | Schmitz et al. | |
| 4,971,015 A | 11/1990 | Gonze | |
| 5,052,223 A * | 10/1991 | Regnault et al. ............ 73/304 C |
| 5,060,619 A | 10/1991 | Sakurai et al. | |
| 5,089,703 A | 2/1992 | Schoen et al. | |
| 5,103,184 A | 4/1992 | Kapsokavathis et al. | |
| 5,119,671 A | 6/1992 | Kopera | |
| 5,134,381 A | 7/1992 | Schmitz et al. | |
| 5,216,409 A | 6/1993 | Ament et al. | |
| 5,230,322 A | 7/1993 | Curran et al. | |
| 5,231,358 A | 7/1993 | Kapsokavathis et al. | |
| 5,255,656 A | 10/1993 | Rader et al. | |
| 5,301,542 A | 4/1994 | Meitzler et al. | |
| 5,361,035 A | 11/1994 | Meitzler et al. | |
| 5,367,264 A | 11/1994 | Brabetz | |
| 5,416,425 A | 5/1995 | Mouaici | |
| 5,489,849 A | 2/1996 | Sadoway et al. | |
| 5,503,004 A | 4/1996 | Agar | |
| 5,594,163 A | 1/1997 | Suzuki | |
| 5,596,150 A * | 1/1997 | Arndt et al. ................. 73/861.12 |

(Continued)

FOREIGN PATENT DOCUMENTS

CH          651931          10/1985

(Continued)

OTHER PUBLICATIONS

PCT International Search Report for PCT/US02/15931 mailed Aug. 26, 2002.

(Continued)

*Primary Examiner* — Vincent Q Nguyen

(57) ABSTRACT

A sensor device (10) for making at least one determination regarding a selected characteristic of a fluid includes a support post (32) that is adapted to be exposed to the fluid. A capacitor has electrodes (66, 68) that are supported near one end of the support post (32). A housing (40) for containing electronics (120) is supported near an opposite end of the support post (32). In a disclosed arrangement, a level sensing element such as a conductive polymer rod is at least partially supported by the support post (32). A disclosed assembly procedure includes overmolding portions of the device onto other portions to provide stable and secure connections between the various portions of the assembly.

20 Claims, 5 Drawing Sheets

U.S. PATENT DOCUMENTS

| | | |
|---|---|---|
| 5,661,405 A | 8/1997 | Simon et al. |
| 5,717,339 A | 2/1998 | Murphy et al. |
| 5,945,831 A * | 8/1999 | Sargent et al. ............ 324/686 |
| 6,885,199 B2 | 4/2005 | Desmier et al. |
| 2003/0000303 A1 | 1/2003 | Livingston et al. |
| 2003/0117153 A1* | 6/2003 | McKenzie et al. ............ 324/663 |
| 2004/0251919 A1 | 12/2004 | Stahlmann et al. |
| 2005/0284220 A1* | 12/2005 | Cotton et al. ............ 73/322.5 |

FOREIGN PATENT DOCUMENTS

| | | |
|---|---|---|
| DE | 69001151 | 10/1993 |
| DE | 199 38 790 A1 | 2/2001 |
| GB | 2 210 459 A | 6/1989 |
| WO | WO 02/27280 | 4/2002 |

OTHER PUBLICATIONS

U.S. Appl. No. 10/150,903, filed May 17, 2002.
U.S. Appl. No. 10/284,433, filed Oct. 30, 2002.
U.S. Appl. No. 10/452,840, filed Jun. 2, 2003.
U.S. Appl. No. 10/991,579, filed Nov. 18, 2004.
U.S. Appl. No. 11/071,820, filed Mar. 3, 2005.
U.S. Appl. No. 11/071,853, filed Mar. 3, 2005.
German Search Report dated Nov. 13, 2007.
US patent 5052223 is the English equivalent of DE 69001151, Mar. 24, 1993.

* cited by examiner

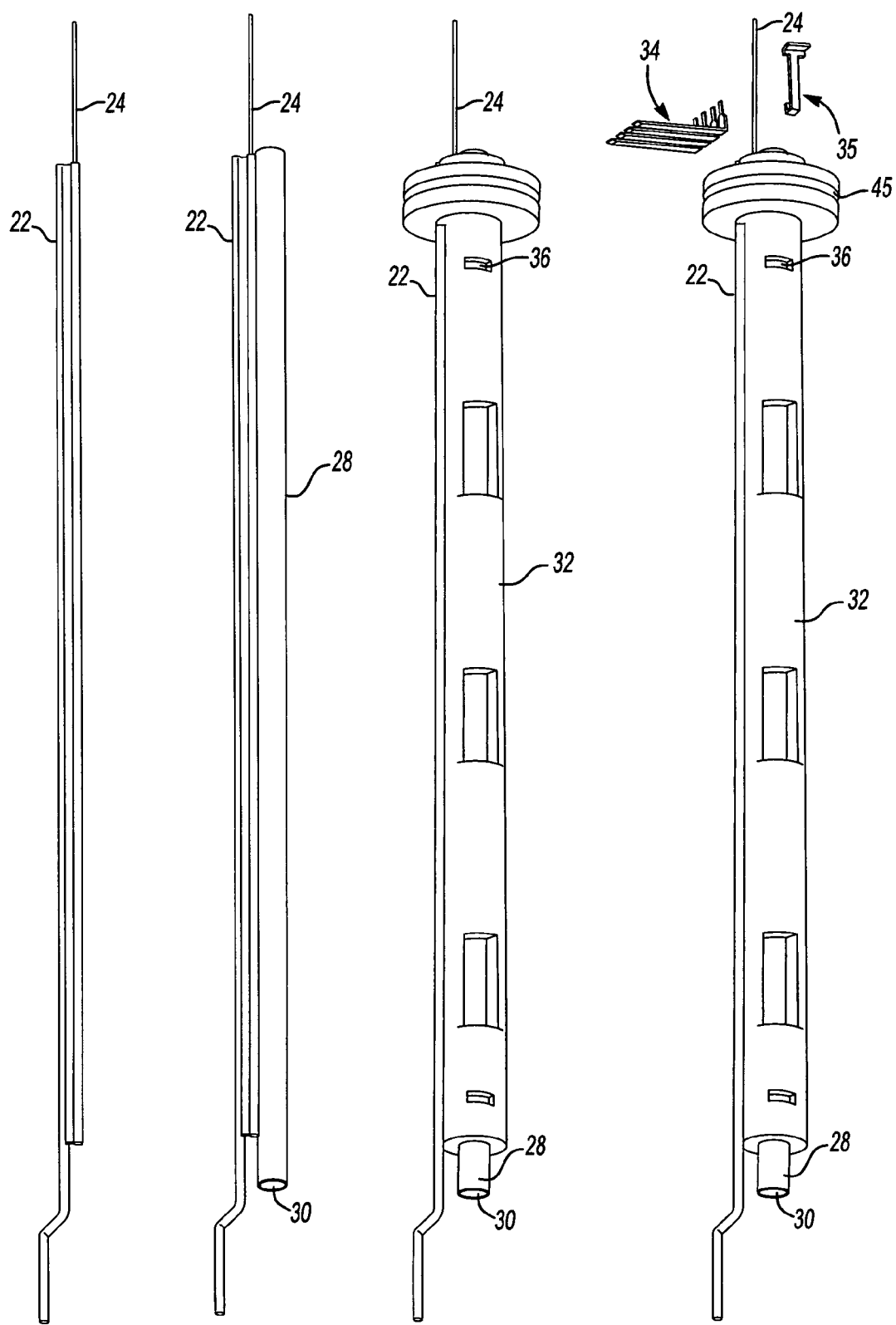

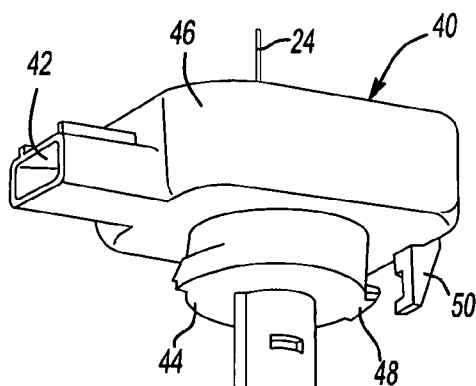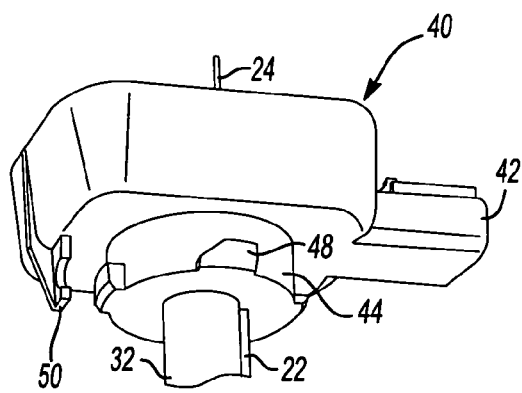
*Fig-6*
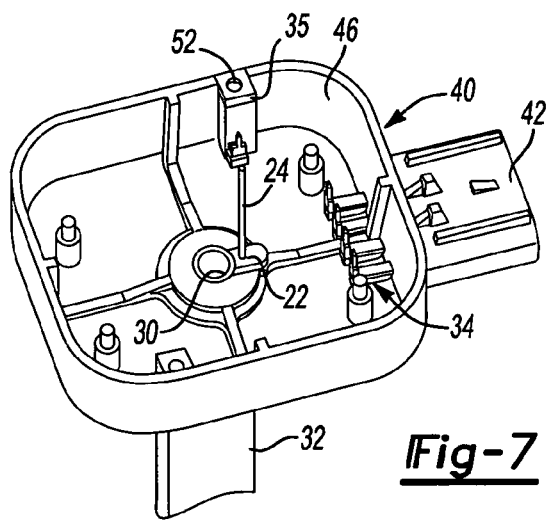
*Fig-7*
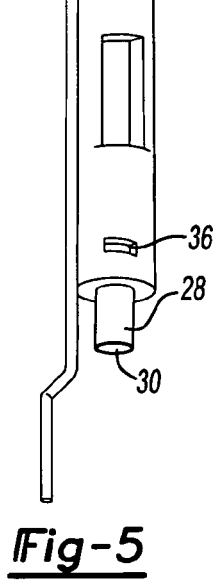
*Fig-5*
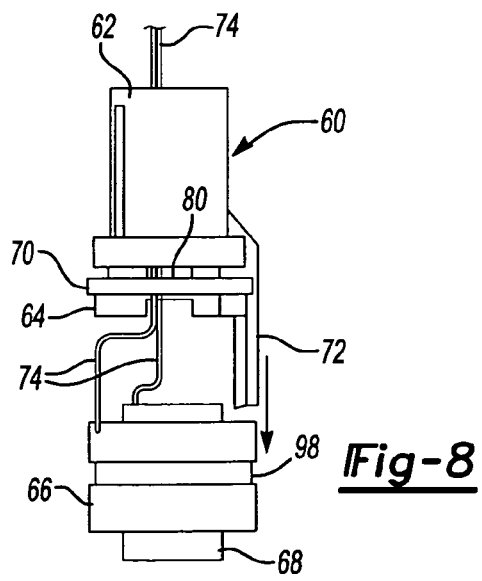
*Fig-8*

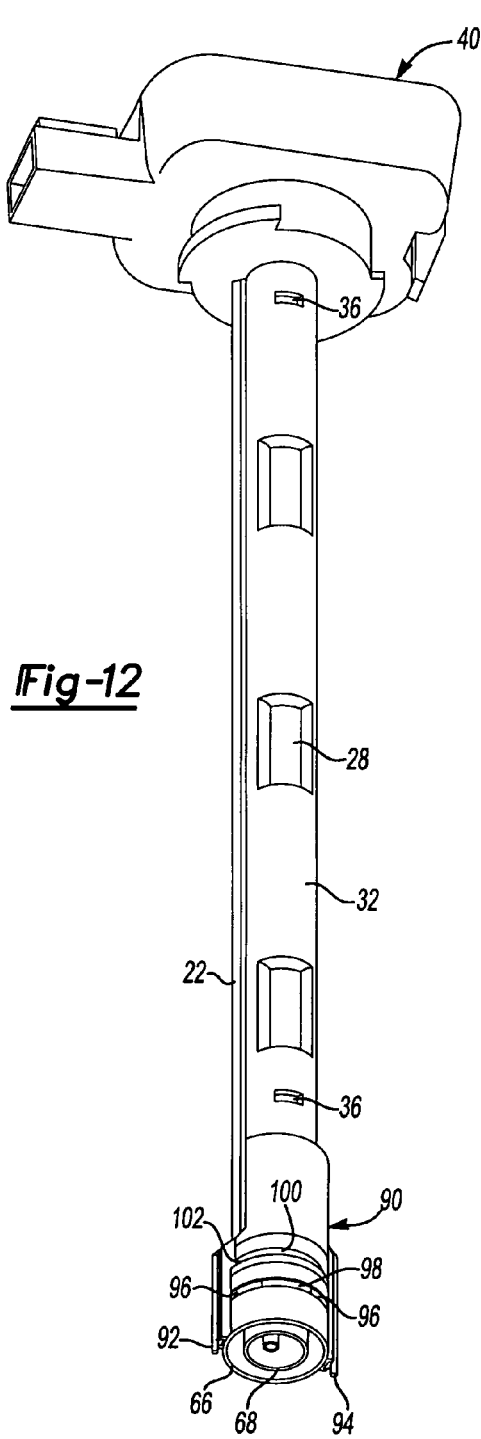
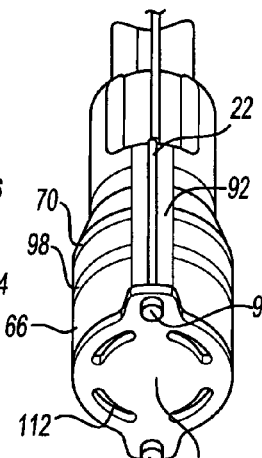
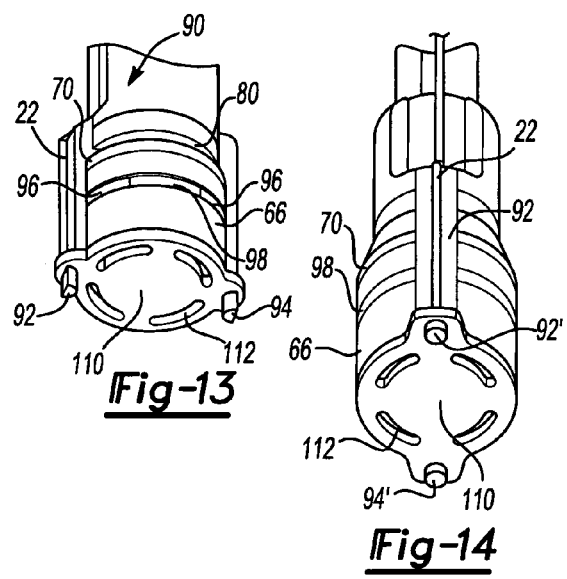
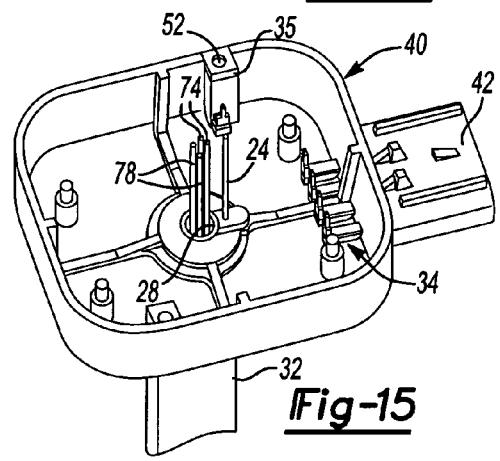
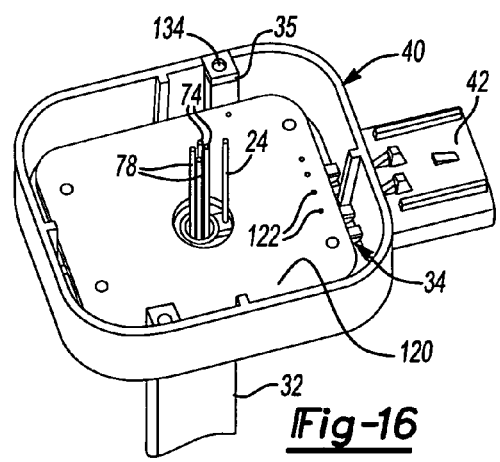

US 7,902,838 B2

SENSOR DEVICE FOR DETERMINING A FLUID PROPERTY

FIELD OF THE INVENTION

This invention generally relates to sensor devices for determining one or more properties of a fluid.

DESCRIPTION OF THE RELATED ART

There are a variety of situations where determining a property of a fluid such as a concentration level of one or more components within a fluid mixture is useful or necessary. One example is in automotive fuel systems. It is useful, for example, to determine the alcohol content within a fuel mixture for purposes of adjusting fuel supply parameters in fuel injection systems. A known technique for making such a determination is shown in U.S. Pat. No. 5,367,264. A variety of such devices are known and commercially available.

One limitation on such devices is that they are only useful for particular fluids. For example, most fuel sensors can only withstand a fluid environment having limited conductivity. Fluids having relatively higher conductivity present special challenges that many concentration measuring devices cannot handle. There is a need for a device that can withstand the more harsh environment of relatively higher conductivity fluids.

Another challenge is to provide a sensor that is capable of withstanding extreme temperature changes. In most automotive fuel systems, for example, the fuel never freezes. Therefore, the sensors are not designed to be within an environment where the fluid changes from a liquid to a solid state. Other situations are not so limited. Where a fluid sensor is required or desirable and the fluid of interest can freeze under normal, expected conditions, the sensor must be capable of withstanding a change in the fluid from a liquid to a solid state. Additionally, such a sensor must be able to withstand the possibility of portions of the fluid being liquid with other portions being frozen solid and having the solid portions bumping into the sensor, which is placed within the fluid container.

One example situation is in selectively catalytic reaction vehicle engine emission control systems. In such systems, urea and deionized water are stored within a tank and supplied to a catalytic converter so that the urea, which produces ammonia hydroxide, effectively controls the nitrogen oxide emissions that result from engine operation. There are no known sensors that are capable of providing a reliable urea concentration level within the urea and water fluid mixture. One difficulty is that the urea and water mixture can freeze at or below 0° C. Additionally, as the mixture thaws, there is a possibility for frozen pieces to be moving about within a container that will bump into a sensor that is at least partially submerged in the fluid mixture.

There is a need for a sensor device that is capable of withstanding the relatively harsh environment of a high conductivity fluid. There is also a need for a sensor device that can withstand large temperature swings and a change in state of the fluid of interest. This invention meets those needs.

SUMMARY OF THE INVENTION

An exemplary disclosed sensor device that is useful for making determinations regarding a fluid includes a support post. A capacitor having at least two electrodes is supported near a first end of the support port. A liquid crystal polymer spacer at least partially supports the electrodes such that there is spacing between the electrodes. A housing portion is at a second, opposite end of the support post.

In one example, the housing portion includes electronics that are used for operating the capacitor.

In one example, the support post is overmolded onto a carrier tube. The carrier tube receives conductors that extend between the capacitor and the housing.

In one example, a conductive level sensing element is at least partially supported by the support post. In one example, the support post is at least partially overmolded onto a corresponding portion of the conductive level sensing element. In one example, the level sensing element comprises a conductive polymer.

The disclosed example arrangement can be made in a cost-efficient manner and provides a sensor structure that is stable within relatively harsh environments.

The various features and advantages of this invention will become apparent to those skilled in the art from the following detailed description of a currently preferred embodiment. The drawings that accompany the detailed description can be briefly described as follows.

BRIEF DESCRIPTION OF THE DRAWINGS

FIG. 1 diagrammatically illustrates a portion of a sensor device designed according to an embodiment of this invention at the beginning of an example assembly procedure.

FIG. 2 diagrammatically illustrates an example next portion of the example assembly procedure following what is shown in FIG. 1.

FIG. 3 FIG. 2 diagrammatically illustrates an example next portion of the example assembly procedure following what is shown in FIG. 2.

FIG. 4 diagrammatically illustrates an example next portion of the example assembly procedure following what is shown in FIG. 3.

FIG. 5 diagrammatically illustrates an example next portion of the example assembly procedure following what is shown in FIG. 4.

FIG. 6 is a perspective illustration showing example features of the housing in the example embodiment from an opposite view as shown in FIG. 5.

FIG. 7 is a perspective illustration of the housing of FIG. 6 from an opposite view.

FIG. 8 diagrammatically illustrates portions of the example sensor device being assembled as a subassembly.

FIG. 12 diagrammatically illustrates a subsequent portion of the assembly process following what is illustrated in FIG. 10.

FIG. 13 illustrates a portion of the assembly shown in FIG. 12 at a subsequent phase of the example assembly process.

FIG. 14 illustrates the components of FIG. 13 in a subsequent portion of the example assembly process.

FIG. 15 is a perspective illustration of an opposite end of the example device at the stage of the example assembly process shown in FIG. 14.

FIG. 16 shows a subsequent portion of the example assembly process subsequent to what is shown in FIG. 15.

DETAILED DESCRIPTION OF THE PREFERRED EMBODIMENT

Figure 19:
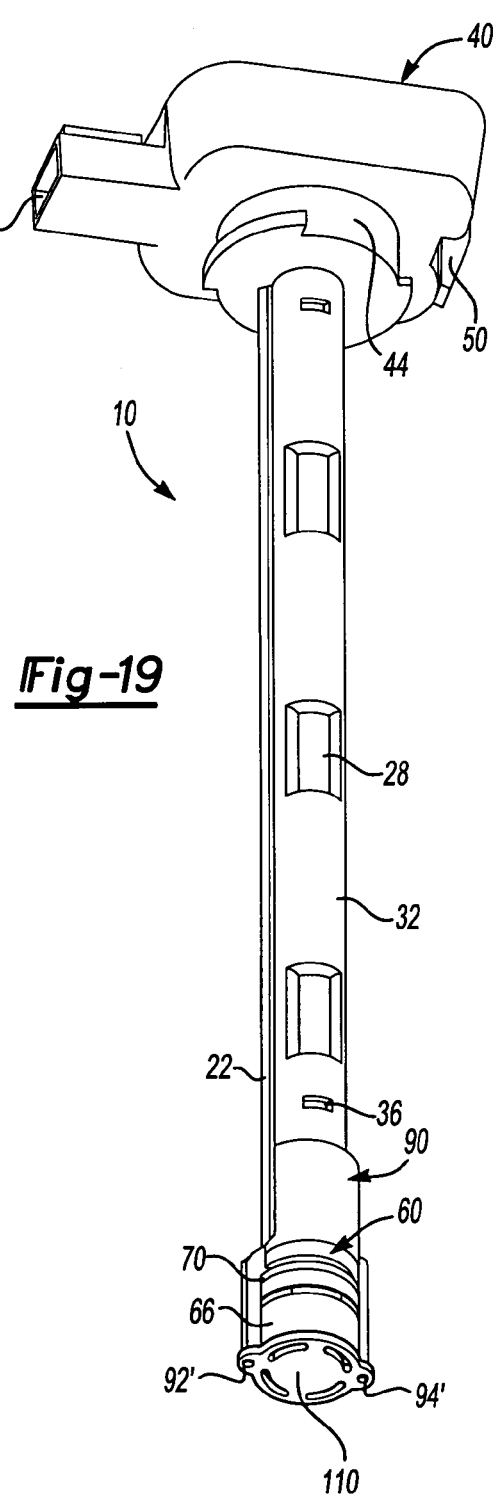
FIG. 19 is a perspective illustration of an example sensor device.

FIG. 19 shows an example sensor device 10 that is designed according to an embodiment of this invention. The various portions of the sensor device 10 will be explained in connection with explaining an example assembly process. The sensor device 10 can be used for making one or more determinations regarding one or more properties of a fluid. In one example, the sensor device 10 is used for determining a concentration level of urea within a fluid mixture that is used for a selective catalytic reaction emission control system. The properties of the sensor device 10 allow it to withstand the relatively high conductivities associated with a fluid containing urea and to withstand wide ranges of temperature swings, both of which render the disclosed device superior to previous sensor designs.

FIG. 1 shows a conductive level sensing element 22 and an electrical conductor 24 at the beginning of an example assembly process for making the sensor device 10. In this example, the conductor 24 comprises a wire that is crimped at one end and embedded in the molded level sensing element 22. In this example, the level sensing element 22 provides a resistance indication that is used for making a level determination regarding the amount of fluid within a container, for example. In this example, the level sensing element 22 comprises a conductive polymer. In one example, the conductive polymer comprises polyphthalamide. This material is available from RTP Company, for example.

A conductive polymer selected for the level sensing element 22 preferably has enough carbon fiber content for conductivity and enough glass fiber content for moldability and mechanical stability.

FIG. 2 shows a subsequent phase of the example assembly process. In FIG. 2, a carrier tube 28 is positioned adjacent the level sensing element 22. The carrier tube 28 in this example is made of a polymer material. The carrier tube 28 includes an opening 30 extending through the length of the example carrier tube for accommodating electrically conductive members as will be described below.

FIG. 3 illustrates the results of a next step in the example assembly process. As shown in FIG. 3, a support post 32 supports the level sensing conductive element 22 and the carrier tube 28. In this example, the support post 32 is overmolded onto the carrier tube 28 and a corresponding portion of the level sensing element 22. One advantage to using an overmolding technique is that various lengths of the support post 32 can be readily achieved with a single molding tool. As can be appreciated from the drawing, at least a portion of the level sensing element 22 has an exposed surface that is positioned to come in direct contact with a fluid into which the support post 32 is at least partially submerged.

One feature of the embodiment shown in FIG. 3 includes location features 36 on the support post 32. The location features 36 are useful for positioning the support post 32 and other portions of the sensor device 10 into manufacturing equipment to achieve a desired alignment of parts, for example.

FIG. 4 illustrates a subsequent step in the example assembly process. At this stage, electrical connector members 34 and an electrical grounding terminal 35 are positioned within a mold (not illustrated) relative to the support post 32.

FIGS. 5-7 shows the results of a next portion of the example assembly process. In FIG. 5, a housing portion 40 is overmolded onto the support post 32 near one end of the support post. The example housing 40 includes a connector terminal 42 that surrounds and supports portions of the connector members 34 for making an electrically conductive connection with an outside device or communicating signals and power between the sensor device 10 and other devices. A mounting base 44 is overmolded onto mounting rings 45, which are formed near the one end of the support post 32 when molding the support post. In one example, the mounting rings 45 melt at least partially during the process of overmolding the housing 40 and thereby bond and seal the housing 40 to the end of the support posts 32. The housing 40 is open at the top (according to FIG. 5).

The mounting base 44 is adapted to be received within an opening in a tank or container that contains the fluid of interest. Locking tabs 48 provide a twist and lock feature as known in the art. Another locking element 50 is provided on the example housing 40 for permanently securing the sensor device 10 against or into a container as desired. In one example, a threaded member such as a screw is received at least partially through the locking member 50 and a corresponding portion of the container.

Figure 9:
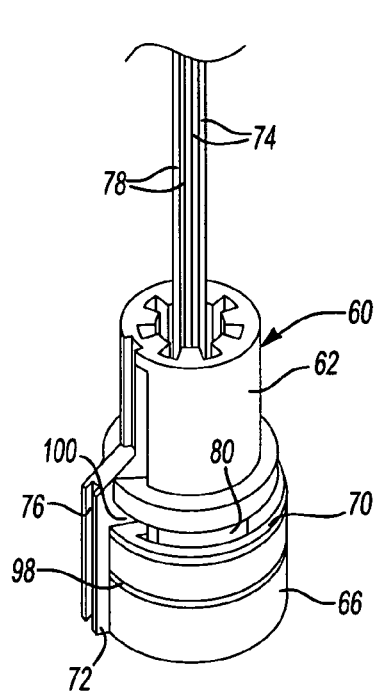
FIG. 9 diagrammatically illustrates the components of FIG. 8 in an assembled condition.

FIGS. 8 and 9 show a capacitor portion of the sensor device 10 that, in this example, is preassembled as a subassembly. In this example, a spacer element 60 has a first portion 62 that is received over the carrier tube 28 and against an end of the support port 32 that is opposite from the end where the housing 40 is located. A spacer portion 64 is received between electrodes 66 and 68 of a capacitor. As best appreciated from FIG. 11, the spacer portion 64 maintains spacing between the electrodes 66 and 68 to prevent electrically shorting them to each other.

In one example, the electrode 66 comprises a grounded cathode and the electrode 68 comprises an anode. The capacitor is operated using a selected technique for providing measurements that are indicative of a selected property of the fluid. When the sensor device 10 is used for urea concentration determination, for example, the capacitor operates in a first mode to provide a permittivity measurement and in a second mode to provide a conductivity measurement. The determined permittivity and conductivity are then used for making a determination regarding the concentration level of urea within the fluid to which the sensor device 10 is at least partially exposed.

The spacer element 60 includes a flange 70 that is received against one edge of the electrode 66. The electrode 68 is received within an internal portion of the spacer element 60. In this example, the capacitor electrodes 66 and 68 are concentric cylindrical portions. Of course, other capacitor designs are within the scope of this invention.

In the illustrated example, the spacer element 60 comprises a liquid crystal polymer. The electrodes 66 and 68 are press fit into place against appropriate portions of the spacer element 60. The liquid crystal polymer is selected to have dielectric properties that remain stable and reliable. Such a material also remains dimensionally stable so that the capacitor remains close to expected characteristics, which may depend, for example, on the spacing between the electrodes 66 and 68.

Figure 10:
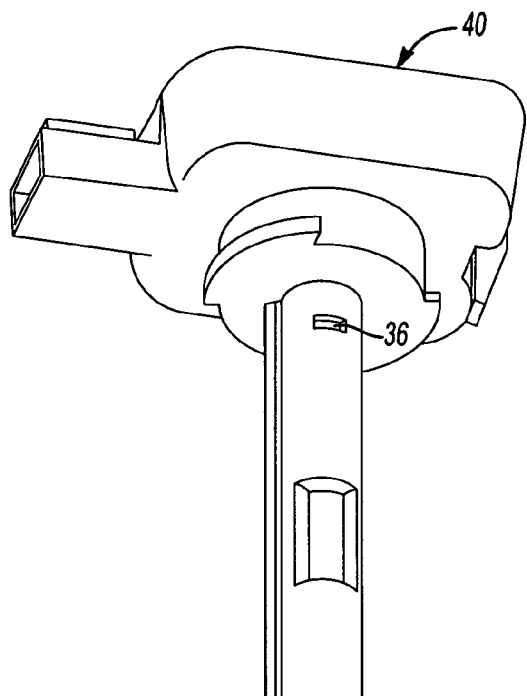
FIG. 10 diagrammatically illustrates the subassembly of FIGS. 8 and 9 secured to the portions shown in FIG. 5.

The example spacer element 60 includes an extension 72 that is received over an outside of the capacitor electrode 66 as best appreciated from FIG. 9. The extension 72 in this example includes a groove 76 for accommodating a corresponding portion of the level sensing element 22 when the subassembly shown in FIGS. 8 and 9 is secured to a remainder of the sensor device 10 as shown in FIG. 10, for example.

Electrical conductors 74 are coupled with the electrodes 66 and 68 and received through a central opening in the spacer element 60. In one example, the conductors 74 are the inner and outer conductors of a coax cable. In one example, the inner conductor is coupled with the anode 68 and the outer shield conductor is coupled with the cathode 66.

Figure 11:
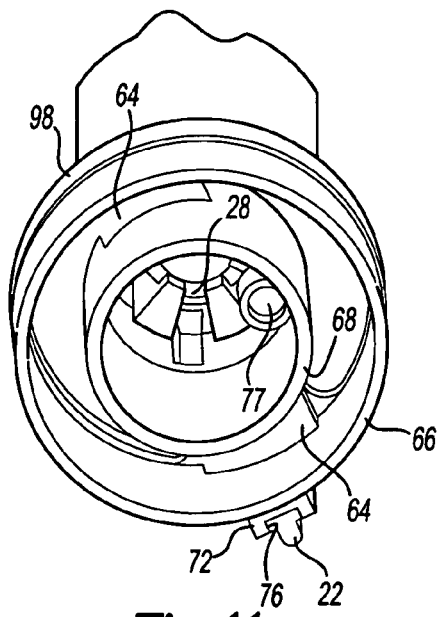
FIG. 11 is a perspective illustration showing one end of the device as shown in FIG. 10.

Referring to FIGS. 9 and 11, a temperature sensor device 77 such as a thermistor or a known NTC device is supported relative to the capacitor for making temperature determinations regarding the fluid in the vicinity of the capacitor. In this example, the anode electrode 68 includes an inner support surface that receives the temperature sensor device 77. Electrical conductors 78 for operating the temperature sensor device 77 are received through the central opening in the spacer element 60 and ultimately through the opening 30 in the carrier tube 28.

The illustrated example includes an opening 80 in the spacer element configuration that allows for the fluid of interest to flow between the electrodes 66 and 68 in a manner that provides reliable measurements from the capacitor.

FIG. 10 shows the capacitor subassembly of FIGS. 8 and 9 aligned with the portion of the sensor device assembled thus far as described above. In this orientation, the assembly is ready for a capacitor support portion to secure the capacitor in place relative to the support post 32.

The next stage in the example assembly procedure is to overmold the capacitor support portion 90 onto the spacer element 60, the cathode electrode 66 and a portion of the support post 32. In this example, the capacitor support portion 90 comprises the same material as the support post 32 and the housing portion 40.

As can be appreciated from FIGS. 12 and 13, extensions 92 and 94 of the capacitor support portion 90 extend along and beyond the length of the electrode 66. At least some of the material of the capacitor support portion 90 is shown at 96 at least partially received within a groove 98 formed on the electrode 66. This occurs during the molding process in the illustrated example. Having the capacitor support portion material extending into the groove 98 provides a mechanical locking feature for securing the capacitor in place. A groove 100 on the spacer element 60, which includes the opening 80, also receives some of the material of the capacitor support portion 90. This material is shown at 102. By having the molded material extend into such grooves, a secure mechanical lock is achieved.

Referring now to FIGS. 13 and 14, a cover 110 is secured against at least the anode 68 to seal off the interior of the anode 68 and the carrier tube opening 30 from the fluid within which the sensor device 10 will be placed. Openings 112 in the cover 110 allow for fluid flow between the capacitor electrodes 66 and 68 to allow for measurements to be made. In the illustrated example, portions of the extensions 92 and 94 are heat staked as shown at 92' and 94' in FIG. 14 to secure the cover 110 in place.

In another example, the cover 110 is eliminated because the sensor device 10 will not be used in fluids that have a conductivity that is high enough to provide concerns requiring a covered arrangement as used in the illustrated example.

Figure 17:
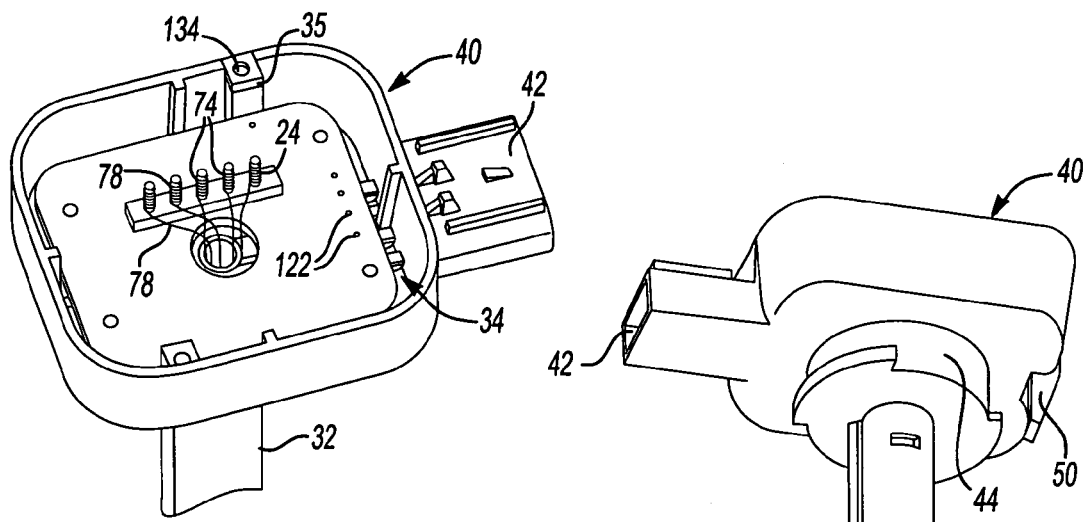
FIG. 17 diagrammatically illustrates a subsequent portion of the assembly process following what is shown in FIG. 16.

At this stage of the example assembly process, the end of the sensor device 10 that includes the capacitor is complete. The remaining portion of the assembly process includes positioning electronics within the housing portion 40 and this is schematically shown in FIGS. 15-17. FIG. 15 shows the assembly including the conductors 74 and 78 extending up through the opening 30 in the carrier tube 28. The conductor 24 associated with the level sensing element 22 also extends into the housing 40. FIG. 16 shows a printed circuit board 120 placed within the housing. The circuit board 120 supports electronics for operating the sensor device 10 in a manner applying known techniques, for example, for making determinations regarding the fluid of interest. The connector members 34 are heat staked at 122 to make electrical connection with appropriate portions of the printed circuit board 120.

As shown in FIG. 17, a plurality of connector posts 124 have appropriate portions of the conductors 24, 74 and 78 wound about them. Using a spiral winding connection technique provides a reliable connection. In one example, the conductors are also soldered to the connector posts 124. Once all connections are made, the housing 40 can be filled with silicon gel.

Figure 18:
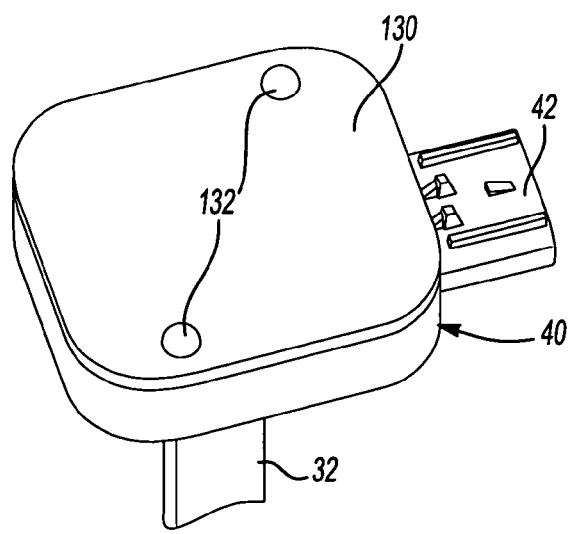
FIG. 18 diagrammatically shows a subsequent portion of the assembly process following FIG. 17.

Referring now to FIGS. 17 and 18, a cover 130 is secured to close off the housing portion 40. In this example, threaded members such as screws 132 are received into corresponding openings formed in the housing. In the illustrated example, an opening 134 is associated with the grounding terminal 35. Accordingly, the screw 132 received within the opening 134 grounds the cover 130, which in one example comprises aluminum. Grounding an aluminum cover provides an EMC shield for the electronics within the housing portion 40.

FIG. 19 shows the completed assembly. At this point, the sensor device 10 can be inserted into a container where the base portion 44 will be locked into place so that the sensor post 32, the level sensing element 22 and the capacitor are exposed to an appropriate amount of fluid within the container. The electronics maintained within the housing 40 remain isolated from the fluid and protected from environmental contamination.

The support post 32 is designed in one example to withstand a wide range of temperatures and to endure impacts from frozen solid portions of a fluid moving about within the container. The disclosed example device provides a more robust and more versatile sensor arrangement compared to previous designs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A sensor device useful for making determinations regarding a fluid, comprising:
   a support post;
   a capacitor having at least two electrodes near a first end of the support post;
   a liquid crystal polymer spacer at least partially supporting the electrodes such that there is spacing between the electrodes;
   a housing portion at a second, opposite end of the support post; and
   a capacitor support portion that is at least partially overmolded onto a portion of the capacitor for securing the capacitor and the liquid crystal polymer spacer to the support post, wherein the capacitor includes an externally oriented groove and some of the material of the capacitor support portion is at least partially received in the groove for mechanically locking the capacitor relative to the support post.

2. The device of claim 1, including a carrier tube extending between the housing and a position near the first end and at least one electrically conductive member at least partially within the carrier tube.

3. The device of claim 2, wherein the support post is overmolded onto the carrier tube.

4. The device of claim 2, wherein the conductive member comprises a coaxial cable having an inner conductor and an outer conductor and wherein the conductors are respectively coupled with the capacitor electrodes.

5. The device of claim 1, including at least one electrically conductive member extending between the capacitor and the housing, electronics supported in the housing and at least one connector member associated with the electronics, the electrically conductive member having a portion that is wrapped about the connector member for making an electrical connection between the capacitor and the electronics.

6. The device of claim 1, wherein the support post and the capacitor support portion comprise the same material.

7. The device of claim 1, wherein the spacer comprises a groove and at least some of the material of the capacitor support portion is at least partially received into the groove for mechanically locking the spacer relative to the support post.

8. The device of claim 1, including a conductive level sensing element supported at least partially on the support post and having an exposed surface that is adapted to contact a fluid that contacts an exterior surface on the support post.

9. The device of claim 8, wherein the conductive level sensing element comprises a conductive polymer.

10. The device of claim 9, wherein the conductive level sensing element comprises polyphthalimide.

11. The device of claim 8, wherein the support post is at least partially overmolded onto a portion of the conductive level sensing element.

12. The device of claim 1, including a grounding terminal supported by the housing and a cover secured to the housing for closing the housing, the cover being electrically coupled to the grounding terminal.

13. The device of claim 1, including a temperature sensing element supported near the capacitor.

14. The device of claim 13, wherein at least one of the capacitor electrodes has an opening and the temperature sensing element is at least partially received in the opening.

15. The device of claim 1, wherein the support post comprises an electrically non-conductive material.

16. The device of claim 1, wherein the support post is distinct from the at least two electrodes of the capacitor.

17. The device of claim 1, wherein the support post has a length and the at least two electrodes of the capacitor each have a second, different length that is relatively smaller than the length of the support post.

18. The device of claim 1, wherein the support post has a length and the capacitor is spaced from the housing by a distance corresponding to the length.

19. A sensor device useful for making determinations regarding a fluid, comprising:
   a support post;
   a capacitor having at least two electrodes near a first end of the support post;
   a liquid crystal polymer spacer at least partially supporting the electrodes such that there is spacing between the electrodes;
   a housing portion at a second, opposite end of the support post; and
   a capacitor support portion that is at least partially overmolded onto a portion of the capacitor for securing the capacitor and the spacer to the support post, wherein the liquid crystal polymer spacer comprises a groove and at least some of the material of the capacitor support portion is at least partially received into the groove for mechanically locking the liquid crystal polymer spacer relative to the support post.

20. A sensor device useful for making determinations regarding a fluid, comprising:
   a support post;
   a capacitor having at least two electrodes near a first end of the support post;
   a liquid crystal polymer spacer at least partially supporting the electrodes such that there is spacing between the electrodes;
   a housing portion at a second, opposite end of the support post; and
   a temperature sensing element supported near the capacitor, wherein at least one of the capacitor electrodes has an opening and the temperature sensing element is at least partially received in the opening.

* * * * *